United States Patent
Zhang et al.

(10) Patent No.: US 11,479,835 B2
(45) Date of Patent: Oct. 25, 2022

(54) SNBISB SERIES LOW-TEMPERATURE LEAD-FREE SOLDER AND ITS PREPARATION METHOD

(71) Applicant: BEIJING COMPO ADVANCED TECHNOLOGY CO., LTD., Beijing (CN)

(72) Inventors: Shaoming Zhang, Beijing (CN); Huijun He, Beijing (CN); Xixue Liu, Beijing (CN); Yanbin Sun, Beijing (CN); Zhigang Wang, Beijing (CN); Qiang Hu, Beijing (CN); Ning An, Beijing (CN); Fuwen Zhang, Beijing (CN); Jie Zhu, Beijing (CN); Jiangsong Zhang, Beijing (CN); Lirong Wang, Beijing (CN); Huankun Zhang, Beijing (CN); Lei Xu, Beijing (CN); Zhihua Zhu, Beijing (CN); Pin Zhang, Beijing (CN)

(73) Assignee: BEIJING COMPO ADVANCED TECHNOLOGY CO., LTD., Beijing (CN)

(*) Notice: Subject to any disclaimer, the term of this patent is extended or adjusted under 35 U.S.C. 154(b) by 312 days.

(21) Appl. No.: 16/324,893

(22) PCT Filed: Nov. 17, 2016

(86) PCT No.: PCT/CN2016/106268
§ 371 (c)(1),
(2) Date: Feb. 11, 2019

(87) PCT Pub. No.: WO2018/028080
PCT Pub. Date: Feb. 15, 2018

(65) Prior Publication Data
US 2020/0123634 A1    Apr. 23, 2020

(30) Foreign Application Priority Data

Aug. 11, 2016   (CN) .......................... 201610657203.7

(51) Int. Cl.
*C22C 13/02*     (2006.01)
*B23K 35/26*     (2006.01)
(Continued)

(52) U.S. Cl.
CPC ............ *C22C 13/02* (2013.01); *B23K 35/262* (2013.01); *B23K 35/264* (2013.01); *C22C 1/03* (2013.01); *C22C 12/00* (2013.01)

(58) Field of Classification Search
CPC ........... C22C 13/02; C22C 1/03; C22C 12/00; B23K 35/262; B23K 35/264
See application file for complete search history.

(56) References Cited

U.S. PATENT DOCUMENTS 6,156,132 A    12/2000  Yamashita et al.
6,884,389 B2    4/2005  Takahashi
(Continued)

FOREIGN PATENT DOCUMENTS

CN       1927525 A    3/2007
CN     101380700 A    3/2009
(Continued)

OTHER PUBLICATIONS

JP2011230165A English (Year: 2021).*
(Continued)

*Primary Examiner* — Robert S Jones, Jr.
*Assistant Examiner* — Jiangtian Xu
(74) *Attorney, Agent, or Firm* — Bayramoglu Law Offices LLC

(57) ABSTRACT

A SnBiSb series low-temperature lead-free solder and a preparation method thereof, which belongs to the technical
(Continued)

field of low-temperature soldering. The lead-free solder includes by weight the following composition: 32.8-56.5% of Bi, 0.7-2.2% of Sb, with the remainder being Sn, wherein the weight percentages of Bi and Sb satisfy a relationship of $b=0.006a^2-0.672a+19.61+c$, wherein the symbol a represents the weight percentage of Bi, the symbol b represents the weight percentage of Sb, and the range of c is $-1.85 \leq c \leq 1.85$. The solder alloy has a peritectic or near peritectic structure with a low melting point, and has an excellent mechanical performance and reliability, and applicable to the field of low-temperature soldering.

20 Claims, 1 Drawing Sheet

(51) Int. Cl.
*C22C 1/03* (2006.01)
*C22C 12/00* (2006.01)

(56) References Cited

U.S. PATENT DOCUMENTS

2015/0037087 A1* 2/2015 Tachibana ............... C22C 13/02 403/272
2016/0214213 A1* 7/2016 Pandher ................. C22C 13/02

FOREIGN PATENT DOCUMENTS

| CN | 102152021 | A | | 8/2011 |
| CN | 103906598 | A | | 7/2014 |
| CN | 105451928 | A | | 3/2016 |
| CN | 105583547 | A | | 5/2016 |
| JP | S358209 | B | | 6/1960 |
| JP | H11221693 | A | | 8/1999 |
| JP | 2000079494 | A | | 3/2000 |
| JP | 2011230165 | A | * | 11/2011 |
| JP | 6548537 | B2 | * | 7/2019 |
| WO | 2015019966 | A1 | | 2/2015 |

OTHER PUBLICATIONS

JP6548537B2 English (Year: 2021).*
Cheng Zhang et al., Effect of Sb content of properties of Sn—Bi solders, Transactions of Nonferrous Metals Society of China, 2014, pp. 184-191, vol. 24.
Hua, Li et al., Corrosion and Electrochemical Migration of 64Sn—35Bi—1Ag Solder Doped with Sb in Advanced Electronic Machanical Packaging, Journal of Hubei University of Education, Aug. 31, 2013, vol. 30, No. 8, ISSN 1674-344X.
Zhang, Cheng et al., Effect of Sb Content on Properties of Sn Bi Solders, Trans. Nonferrous Met Soc. China, Jan. 31, 2014, p. 184-191, vol. 24, ISSN: 1003-6326.

* cited by examiner

SNBISB SERIES LOW-TEMPERATURE LEAD-FREE SOLDER AND ITS PREPARATION METHOD

CROSS REFERENCE TO THE RELATED APPLICATIONS

This application is the national phase entry of International Application No. PCT/CN2016/106268, filed on Nov. 17, 2016, which is based upon and claims priority to Chinese Patent Application No. 201610657203.7, filed on Aug. 11, 2016, the entire contents of which are incorporated herein by reference.

TECHNICAL FIELD

The present invention relates to a SnBiSb series low-temperature lead-free solder and its preparation method, in particular to a SnBiSb-X lead-free solder alloy and its preparation method used in the field of low-temperature soldering, and thus belongs to the technical field of low-temperature solder.

BACKGROUND

With the rapid development of electronic products toward lead-free, light and thin, and high performance direction, the SnAgCu series (especially SAC305) lead-free solder primarily used in the current SMT encounters many problems, because the melting point of the solder is high (200° C.-230° C.), and the new light and thin tiny chip used in the reflow soldering process is very sensitive to temperature, while the BGA elements common in the SMT process, such as Head-On-Pillow (HoP), Solder BridCu Defect, Stretched Joint, Non-Contact Open (NCO), also have a more and more serious problem regarding the welding spot defect caused by high temperature at the time of welding, and thus a market demand for a low-temperature solder (including but not limited to solder paste, solder wire, solder bar) is very urgent. The low-temperature solder in the prior art is mainly of SnBi series or SnIn series, but the industrialization of the SnIn series solder is limited due to expensive price of In. SnBi series, especially SnBi58 solder, are often used in low temperature welding applications. However, since Bi itself is brittle, especially Sn—Bi eutectic alloy will have a reaction between Sn and Cu substrates in the structure during welding process to form Sn—Cu intermetallic compound, resulting in a decrease in the relative amount of Sn in this local region, and an increase in the relative amount of Bi, thus SnBi alloy shift from eutectic system to hypereutectic system, the primary Bi phase precipitates, the primary Bi phase is segregated near the substrate, and form a Bi-rich band. The Bi-rich band becomes the weakest region of the welding spot, severely affecting the bonding strength of the welding spot, which makes SnBi series solder research and use has been in a low state. A series of studies have been carried out on the problem of Bi brittleness both at home and abroad, and it has been found that the addition of a trace of Ag and Cu into Sn—Bi solder can improve the brittleness to a certain extent. Alloy solders, such as SnBi57Ag1 alloy disclosed by a Motorola patent, SnBi35Ag1 alloy developed in a Fuji Patent U.S. Pat. No. 6,156,132, and SnBiCu alloy disclosed in CN 200610089257.4/CN 200710121380.4, inhibit to a certain extent the segregation of the Bi element in the vicinity of the substrate during welding solidification process, but the emergence of weak band of Bi-rich layer at the welding interface can not be completely avoided, thus the problem of poor reliability of welding spots have not been solved essentially. CN 105451928 A discloses a SnBiSb invention, which also adds a small amount of Sb element into SnBi binary alloy, to improve mechanical performance of the SnBi alloy solder, but has not fundamentally solve the problems of low brittleness and poor reliability of SnBi solder.

SUMMARY

It is an object of the present invention to overcome the shortcomings of the prior art by providing a novel SnBiSb-X lead-free solder alloy in the field of low-temperature soldering, which has a low melting point, and can fundamentally solve the problems of poor brittleness and reliability of SnBi solder.

The novel SnBiSb low-temperature lead-free solder alloy of the invention has a peritectic or near-peritectic alloy structure with fine grains, and at the same time, the Sb element and Bi are infinitely solid soluble, and thus can maximally eliminate the stress concentration caused by "Sn decrease and Bi increase" during solidification process, and achieve an effect of stress sharing, thereby fundamentally solving the problems poor brittleness of SnBi solder. At the same time, SnBiSb-X solder alloy can solve a series of welding quality problems caused by warping, deformation and head-in-pillow of the welded parts in the micro-chip, BGA, CSP etc., due to high temperature in welding process.

The present invention is achieved by the following technical solutions:

A SnBiSb series low-temperature lead-free solder belongs to a lead-free solder alloy used in the field of low-temperature soldering, the lead-free solder alloy comprising by weight: 32.8-56.5% of Bi, 0.7-2.2% of Sb, with the remainder being Sn and a small amount of inevitable impurities, wherein the weight percentages of Bi and Sb in the solder alloy satisfy a relationship of $b=0.006a^2-0.672a+19.61+c$, wherein the symbol a represents the weight percentage of Bi, the symbol b represents the weight percentage of Sb, and the range of c is $-1.85 \le c \le 1.85$.

In the lead-free solder alloy, the composition by weight of Bi and Sb is preferably: Bi 41.8-50%, Sb 0.7-2.0%.

The range of c is preferably $-1.85 \le c \le -0.001$ or $0.001 \le c \le 1.85$ or $-1.5 \le c \le -0.005$ or $0.005 \le c \le 1.5$ or $-1.5 \le c \le -0.008$ or $0.008 \le c \le 1.5$, more preferably $-1.0 \le c \le -0.05$ or $0.05 \le c \le 1.0$ or $-0.5 \le c \le -0.05$ or $0.05 \le c \le 0.5$.

The lead-free solder alloy further comprises one or more metal elements selected from the group consisting of Ce, Ti, Cu, Ni, Ag and In.

Ce is 0.01-2.5% by weight, wherein Ce is preferably 0.01-2.5% by weight, more preferably 0.03-2.0%.

Ti is 0.05-2.0% by weight, wherein Ti is preferably 0.1-1.8% by weight, more preferably 0.5-1.5%.

Cu is 0.01-0.8% by weight, wherein Cu is preferably 0.01-0.5% by weight, more preferably 0.02-0.3%.

Ni is 0.03-1.5% by weight, wherein Ni is preferably 0.05-1.5% by weight, more preferably 0.3-1.0%.

Ag is 0.1-1% by weight, wherein Ag is preferably 0.3-1% by weight, more preferably 0.3-0.5%.

In is 0.05-1% by weight, wherein In is preferably 0.1-0.8% by weight, more preferably 0.3-0.5%.

Also provided is a preparation method for lead-free solder alloy in the field of low-temperature solder paste, the method comprising the following steps:

1) preparing a Bi—Sb master alloy; or preparing a Bi—Sb master alloy and one or more master alloys of Sn—Ce, Sn—Ti, Sn—Cu, Sn—Ni and Sn—Ag;

2) melting the prepared Bi—Sb master alloy and metals Sn, Bi or melting the Bi—Sb master alloy, metals Sn, Bi and one or more of the Sn—Ce master alloy, Sn—Ti master alloy, Sn—Cu master alloy, Sn—Ni master alloy, Sn—Ag master alloy and metal In in a melting furnace at a certain alloy ratio; covering a surface of the alloy with an anti-oxidation solvent, heating the alloy to a temperature of 250-500° C., maintaining the temperature for 10-20 minutes, removing oxide slag on the surface, pouring into a mold to obtain an ingot of SnBiSb series lead-free solder allo; wherein the weight percentages of Bi and Sb in the SnBiSb series lead-free solder alloy should satisfy a relationship of $b=0.006a^2-0.672a+19.61+c$, wherein the symbol a represents the weight percentage of Bi, the symbol b represents the weight percentage of Sb, and the range of c is $-1.85 \leq c \leq 1.85$.

A method for preparing the Bi—Sb master alloy in the step 1) comprises the following steps: placing separately the metals Bi and Sb having a purity of 99.99% (wt. %) into a vacuum melting furnace at a certain alloy ratio, performing vacuum treatment to $1 \times 10^{-2}$ to $1 \times 10^{-1}$ Pa, charging nitrogen and then heating the alloy to a temperature of 650-700° C. to be melted, performing electromagnetic stirring at the same time to make the alloy composition uniform, and then performing vacuum casting, so as to obtain the Bi—Sb master alloy. The Bi—Sb master alloy may be BiSb20 master alloy.

A method for preparing the Sn—Ce, Sn—Ti, Sn—Cu, Sn—Ni, Sn—Ag master alloys in the step 1) comprises the following steps: placing separately the metals Sn and Ce, Sn and Ti, Sn and Cu, Sn and Ni, or Sn and Ag having a purity of 99.99% (wt. %) into a vacuum melting furnace at a certain alloy ratio, performing vacuum treatment to $1 \times 10^{-2}$ to $1 \times 10^{-1}$ Pa, charging nitrogen and then heating separately the alloys to a temperature of 400-1650° C. to be melted, performing electromagnetic stirring at the same time to make the alloy composition uniform, and then performing vacuum casting, so as to obtain the Bi—Sb, Sn—Ce, Sn—Ti, Sn—Cu, Sn—Ni or Sn—Ag master alloy. The Sn—Ce master alloy may be SnCe10, the Sn—Ti master alloy may be SnTi20, the Sn—Cu master alloy may be SnCu20, the Sn—Ni master alloy may be SnNi5, and the Sn—Ag master alloy may be SnAg20.

The anti-oxidation solvent in the step 2) is rosin or KCL-LiCl fused salt.

A welding spot or welding seam is formed by using the SnBiSb series low-temperature lead-free solder of the present invention, wherein the welding spot or welding seam is formed with common solder paste reflux, wave soldering, or heat fusion welding, wherein the heat fusion welding includes preformed soldering lug, soldering strip, soldering ball and soldering wire etc., and in addition to the solder composition, the welding spot or welding seam alloy also includes other substrate alloying elements, such as but not limited to Cu, Ag, Ni, Au. The welding spot or welding seam alloy comprises by weight the following composition: Bi 32.8-56.5%, Sb 0.7-2.2%, Cu 0.01-1.5%, Ni 0.03-2.0%, Ag 0.1-1.5%, Ce 0-2.5%, Ti 0-2.0%, In 0-1%, with the remainder being Sn and small amount of inevitable substrate alloying elements.

Advantage of the Invention

The SnBiSb ternary peritectic or near-peritectic solder alloy of the invention has small grain size, a melting point of 139-160° C. with a small melting range, wherein the melting point is reduced by nearly 80° C. with respect to the SnAgCu series solder alloy. In SnBiSb alloy, Sb element and Bi are infinitely solid soluble, thus Sb will be dissolved in the Bi phase structure during solidification process, thereby changing the island-like distribution of the Bi-rich phase of the original SnBi alloy to a small BiSb layer-like distribute, and thus structurally really solves the problem of alloy brittleness caused by the aggregation of Bi-rich phase, and thus can maximally eliminate the stress concentration caused by "Sn decrease and Bi increase" during solidification process, and achieve an effect of stress sharing, thereby fundamentally improving the brittleness of the alloy. Also, the addition of Sb helps to improve the electrode potential of the alloy matrix, thereby improving the corrosion resistance of the alloy.

The weight percentages of Bi and Sb satisfy a relationship of $b=0.006a^2-0.672a+19.61+c$, wherein the symbol a represents the weight percentage of Bi, the symbol b represents the weight percentage of Sb, and the range of c is $-1.85 \leq c \leq 1.85$, and the SnBiSb series solder alloy that satisfies this relationship has a peritectic or near peritectic structure, a low melting point, a small melting range and an excellent mechanical performance.

In the present invention, a certain amount of alloying elements Ce and Ti is added in the SnBiSb solder alloy, and a dense oxide film is formed on the surface of the solder through combined effects of the elements, as if a "barrier layer" is formed, such that oxide of Bi distribute on the subsurface, preventing oxidation of the solder, improving oxidation resistance of the alloy, and fundamentally eliminating the problem of black weld of the SnBi solder. Also, addition of Ni, In elements further improves the strength and toughness of the alloy, and a trace of Cu element can facilitate the wetting and spreading ability of the alloy.

In the present invention, every element of the solder alloy has a melting point below 160° C. in its selected composition range; the welding spot formed by using this solder alloy has better oxidation resistance and reliability, and the welding spot is bright without black weld.

In the method for preparing the lead-free solder alloy disclosed by the present invention, the Bi—Sb master alloy is prepared firstly, and then Sn, Bi are added according to a certain weight percentage ratio, and the obtained SnBiSb solder alloy has a good mechanical performance, because Bi and Sb have very close and almost the same atomic radius and lattice constant, and the lattice types are both of rhombohedral structure, which determines that it is easier to form substitutional infinite solid solution in the Bi and Sb binary alloy, and that once such a solid solution is formed and a third alloying element is added, higher power is needed to substitute any one element of Bi and Sb, which in turn determines that the macro mechanical performance of the alloy is significantly improved. In the present invention, the preparation method for the solder alloy exactly utilizes this advantage, by firstly forming the BiSb master alloy, and then adding Sn element, which can react with Bi in the BiSb alloy and form solid solution with Sb. This method can obtain a solder alloy with more superior mechanical performances, with respect to the method for preparing the alloy directly with the three elements of Sn, Bi, Sb and the method of preparing Sn—Sb alloy firstly and then adding Bi. Thus, this is the biggest innovation point of the preparation method of the present invention.

Hereinafter, the invention is further explained by the accompanying drawings and the detailed description, without limiting the scope of the invention in any sense.

DETAILED DESCRIPTION OF THE EMBODIMENTS

Figure 1:
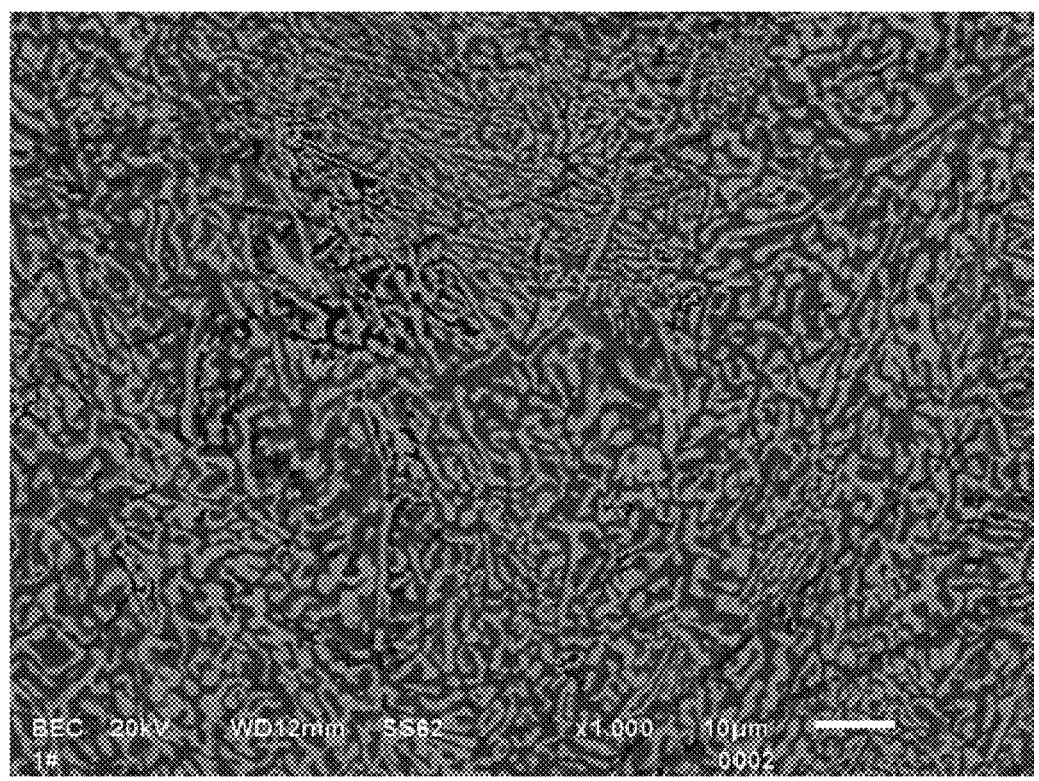
FIG. 1 is an SEM image of the structure of the solder alloy prepared according to example 2 of the present invention.

A lead-free solder alloy according to the present invention comprises Bi, Sb and Sn, of which the composition by weight is: 32.8-56.5% of Bi, 0.7-2.2% of Sb, with the remainder being Sn, wherein the weight percentages of Bi and Sb in the solder alloy satisfy a relationship of $b=0.006a^2-0.672a+19.61+c$, wherein the symbol a represents the weight percentage of Bi, the symbol b represents the weight percentage of Sb, and the range of c is $-1.85 \leq c \leq 1.85$. The range of c is preferably $-1.85 \leq c \leq -0.001$ or $0.001 \leq c \leq 1.85$ or $-1.5 \leq c \leq -0.005$ or $0.005 \leq c \leq 1.5$ or $-1.5 \leq c \leq -0.008$ or $0.008 \leq c \leq 1.5$, more preferably $-1.0 \leq c \leq -0.05$ or $0.05 \leq c \leq 1.0$ or $-0.5 \leq c \leq -0.05$ or $0.05 \leq c \leq 0.5$.

A preparation method for the alloy includes the following steps: (1) preparing a Bi—Sb master alloy; (2) preparing separately master alloys of Sn—Ce, Sn—Ti, Sn—Cu, Sn—Ni, and Sn—Ag according to a certain ratio; (3) melting in a melting furnace the Bi—Sb master alloy, metals Sn and Bi, and/or the master alloys prepared in the second step, and/or metal In according to a certain alloy ratio, covering a surface of the alloy with an anti-oxidation solvent, heating to a temperature of 200-500° C., maintaining the temperature for 10 to 20 minutes, removing oxide slag on the surface, pouring into a mold to obtain an ingot of SnBiSb series lead-free solder alloy.

Example 1

A lead-free solder alloy used in the field of low-temperature soldering is provided, the lead-free solder alloy comprising by weight: 41.8% of Bi, 2.1% of Sb, with the remainder being Sn and inevitable impurities, wherein the lead-free solder alloy has a near peritectic structure, with a melting point of the alloy being 142.9-150.8° C. A preparation method for the lead-free solder alloy includes the following steps:

1) placing metals Bi and Sb having a purity of 99.99 wt. % into a vacuum melting furnace at an alloy ratio of 80:20 by weight, performing vacuum treatment to $1 \times 10^{-1}$ Pa, charging nitrogen and then heating the alloy to a temperature of 650-700° C. to be melted, performing electromagnetic stirring at the same time to make the alloy composition uniform, and then performing vacuum casting, so as to obtain a Bi—Sb20 master alloy;

2) melting the prepared Bi—Sb master alloy together with metals Sn and Bi at an alloy ratio in the melting furnace, covering a surface of the alloy with an anti-oxidation solvent, which can be selected from rosin or LiCl-KCL fused salt, heating the alloy to a temperature of 250° C., maintaining the temperature for 10 minutes, removing oxide slag on the surface, pouring into a mold to obtain an ingot of SnBi41.8Sb2.1 lead-free solder alloy.

Example 2

A lead-free solder alloy used in the field of low-temperature soldering is provided, the lead-free solder alloy comprising by weight: 50% of Bi, 1.0% of Sb, with the remainder being Sn and inevitable impurities, wherein the lead-free solder alloy has a peritectic structure, with a melting point being 140.6-143.8° C. The lead-free solder alloy is prepared in the same manner as in Example 1, except that the alloy ratio is different.

FIG. 1 shows an SEM image of the structure of the solder alloy prepared in this example. It can be seen from the figure that the alloy has a peritectic structure.

Example 3

A lead-free solder alloy used in the field of low-temperature soldering is provided, the lead-free solder alloy comprising by weight: 55% of Bi, 0.8% of Sb, 0.01% of Ce, 0.05% of Ti, with the remainder being Sn and inevitable impurities, wherein the lead-free solder alloy has a near peritectic structure, with a melting point being 142.9-146.2° C. A preparation method for the lead-free solder alloy includes the following steps:

1) placing metals Bi and Sb having a purity of 99.99 wt. % into a vacuum melting furnace at an alloy ratio of 80:20 by weight, performing vacuum treatment to $1 \times 10^{-2}$ Pa, charging nitrogen and then heating the alloy to a temperature of 650-700° C. to be melted, performing electromagnetic stirring at the same time to make the alloy composition uniform, and then performing vacuum casting, so as to obtain a Bi—Sb20 master alloy;

2) placing separately metals Sn and Ce, Sn and Ti having a purity of 99.99 wt. % into a vacuum melting furnace at a certain alloy ratio, performing vacuum treatment to $1 \times 10^{-2}$ Pa, charging nitrogen and then heating separately the alloys to temperatures of 690-780° C. and 1550-1650° C. to be melted, performing electromagnetic stirring at the same time to make the alloy composition uniform, and then performing vacuum casting, so as to obtain separately Sn—Ce10 and Sn—Ti20 master alloys;

3) melting the prepared Bi—Sb, Sn—Ce, and Sn—Ti master alloys together with metals Sn and Bi at an alloy ratio in the melting furnace, covering a surface of the alloy with an anti-oxidation solvent (rosin or KCL-LiCl fused salt), heating the alloy to a temperature of 400° C., maintaining the temperature for 15 minutes, removing oxide slag on the surface, pouring into a mold to obtain an ingot of SnBi55Sb0.8Ce0.01Ti0.05 lead-free solder alloy.

Example 4

A lead-free solder alloy used in the field of low-temperature soldering is provided, the lead-free solder alloy comprising by weight: 44.2% of Bi, 1.7% of Sb, 0.05% of Ce, 0.1% of Ti, with the remainder being Sn and inevitable impurities, wherein the lead-free solder alloy has a near peritectic structure, with a melting point of the alloy being 145.2-150.5° C. The lead-free solder alloy is prepared in the same manner as in Example 3, except that the alloy ratio is different.

Example 5

A lead-free solder alloy used in the field of low-temperature soldering is provided, the lead-free solder alloy comprising by weight: 44.2% of Bi, 1.7% of Sb, 0.1% of Ce, 0.8% of Ti, 0.01% of Cu, 0.03% of Ni, with the remainder being Sn and inevitable impurities, wherein the lead-free solder alloy has a near peritectic structure, with a melting point of the alloy being 147.5-152.9° C. A preparation method for the lead-free solder alloy includes the following steps:

1) placing metals Bi and Sb having a purity of 99.99 wt. % into a vacuum melting furnace at an alloy ratio of 80:20 by weight, performing vacuum treatment to $1 \times 10^{-2}$ Pa, charging nitrogen and then heating the alloy to a temperature of 650-700° C. to be melted, performing electromagnetic stirring at the same time to make the alloy composition uniform, and then performing vacuum casting, so as to obtain a Bi—Sb20 master alloy;

2) placing separately metals Sn and Ce, Sn and Ti, Sn and Cu, Sn and Ni having a purity of 99.99 wt. % into a vacuum melting furnace at a certain alloy ratio, performing vacuum treatment to $1 \times 10^{-2}$ Pa, charging nitrogen and then heating separately the alloys to temperatures of 690-780° C., 1550-1650° C., 750-820° C., and 900-1100° C. to be melted, performing electromagnetic stirring at the same time to make the alloy composition uniform, and then performing vacuum casting, so as to obtain separately Sn—Ce10, Sn—Ti20, Sn—Cu20, Sn—Ni5 master alloys;

3) melting the prepared Bi—Sb, Sn—Ce, Sn—Ti, Sn—Cu, Sn—Ni master alloys together with metals Sn and Bi at an alloy ratio in the melting furnace, covering a surface of the alloy with an anti-oxidation solvent (rosin or KCL-LiCl fused salt), heating the alloy to a temperature of 450° C., maintaining the temperature for 15 minutes, removing oxide slag on the surface, pouring into a mold to obtain an ingot of SnBi44.2Sb1.7Ce0.1Ti0.8Cu0.01Ni0.03 lead-free solder alloy.

Example 6

A lead-free solder alloy used in the field of low-temperature soldering is provided, the lead-free solder alloy comprising by weight: 56.5% of Bi, 0.7% of Sb, 0.5% of Ce, 1.0% of Ti, 0.03% of Cu, 0.07% of Ni, 0.1% of Ag, with the remainder being Sn and inevitable impurities, wherein the lead-free solder alloy has a near peritectic structure, with a melting point of the alloy being 146.1-154.3° C. A preparation method for the lead-free solder alloy includes the following steps:

1) placing metals Bi and Sb having a purity of 99.99 wt. % into a vacuum melting furnace at an alloy ratio of 80:20 by weight, performing vacuum treatment to $1 \times 10^{-2}$ Pa, charging nitrogen and then heating the alloy to a temperature of 650-700° C. to be melted, performing electromagnetic stirring at the same time to make the alloy composition uniform, and then performing vacuum casting, so as to obtain a Bi—Sb20 master alloy;

2) placing separately metals Sn and Ce, Sn and Ti, Sn and Cu, Sn and Ni, Sn and Ag having a purity of 99.99 wt. % into a vacuum melting furnace at a certain alloy ratio, performing vacuum treatment to $1 \times 10^{-2}$ Pa, charging nitrogen and then heating separately the alloys to temperatures of 690-780° C., 1550-1650° C., 750-820° C., 900-1100° C., 800-900° C. to be melted, performing electromagnetic stirring at the same time to make the alloy composition uniform, and then performing vacuum casting, so as to obtain separately SnCe10, SnTi20, SnCu20, SnNi5, SnAg20 master alloys;

3) melting the prepared Bi—Sb, Sn—Ce, Sn—Ti, Sn—Cu, Sn—Ni, Sn—Ag master alloys together with metals Sn and Bi at an alloy ratio in the melting furnace, covering a surface of the alloy with an anti-oxidation solvent (oil bath), heating the alloy to a temperature of 450° C., maintaining the temperature for 15 minutes, removing oxide slag on the surface, pouring into a mold to obtain an ingot of SnBi56.5Sb0.7Ce0.5Ti1Cu0.03Ni0.07Ag0.1 lead-free solder alloy.

Example 7

A lead-free solder alloy used in the field of low-temperature soldering is provided, the lead-free solder alloy comprising by weight: 45% of Bi, 1.5% of Sb, 1.0% of Ce, 1.5% of Ti, 0.1% of Cu, 0.5% of Ni, 0.5% of Ag, with the remainder being Sn and inevitable impurities, wherein the lead-free solder alloy has a near peritectic structure, with a melting point of the alloy being 144.9-152.7° C. It is prepared in the same manner as in Example 6, except that the alloy ratio is different.

Example 8

A lead-free solder alloy used in the field of low-temperature soldering is provided, the lead-free solder alloy comprising by weight: 42.3% of Bi, 2.0% of Sb, 1.5% of Ce, 1.5% of Ti, 0.5% of Cu, 1.2% of Ni, 0.8% of Ag, 0.05% of In, with the remainder being Sn and inevitable impurities, wherein the lead-free solder alloy has a near peritectic structure, with a melting point of the alloy being 148.5-158.7° C. A preparation method for the lead-free solder alloy includes the following steps:

1) placing metals Bi and Sb having a purity of 99.99 wt. % into a vacuum melting furnace at an alloy ratio of 80:20 by weight, performing vacuum treatment to $1 \times 10^{-2}$ Pa, charging nitrogen and then heating the alloy to a temperature of 650-700° C. to be melted, performing electromagnetic stirring at the same time to make the alloy composition uniform, and then performing vacuum casting, so as to obtain a Bi—Sb20 master alloy;

2) placing separately metals Sn and Ce, Sn and Ti, Sn and Cu, Sn and Ni, Sn and Ag having a purity of 99.99 wt. % into a vacuum melting furnace at a certain alloy ratio, performing vacuum treatment to $1 \times 10^{-2}$ Pa, charging nitrogen and then heating separately the alloys to temperatures of 690-780° C., 1550-1650° C., 750-820° C., 900-1100° C., 800-900° C. to be melted, performing electromagnetic stirring at the same time to make the alloy composition uniform, and then performing vacuum casting, so as to obtain separately SnCe10, SnTi20, SnCu20, SnNi5, SnAg20 master alloys;

3) melting the prepared Bi—Sb, Sn—Ce, Sn—Ti, Sn—Cu, Sn—Ni, Sn—Ag master alloys together with metals In, Sn and Bi at an alloy ratio in the melting furnace, covering a surface of the alloy with an anti-oxidation solvent (rosin), heating the alloy to a temperature of 500° C., maintaining the temperature for 15 minutes, removing oxide slag on the surface, pouring into a mold to obtain an ingot of SnBi42.3Sb2Ce1.5Ti1.5 Cu0.5Ni1.2Ag0.8In0.05 lead-free solder alloy.

Example 9

A lead-free solder alloy used in the field of low-temperature soldering is provided, the lead-free solder alloy comprising by weight: 42.3% of Bi, 2.0% of Sb, 2.5% of Ce, 2.0% of Ti, 0.8% of Cu, 1.5% of Ni, 1.0% of Ag, 1.0% of In, with the remainder being Sn and inevitable impurities, wherein the lead-free solder alloy has a near peritectic structure, with a melting point of the alloy being 150.1-159.3° C. The lead-free solder alloy is prepared in the same manner as in Example 8, except that the alloy ratio is different.

Example 10

A lead-free solder alloy used in the field of low-temperature soldering is provided, the lead-free solder alloy comprising by weight: 42.3% of Bi, 2.0% of Sb, 0.5% of Ag, with the remainder being Sn and inevitable impurities, wherein the lead-free solder alloy has a near peritectic structure, with a melting point of the alloy being 144.8-146.9° C. A preparation method for the lead-free solder alloy includes the following steps:

1) placing metals Bi and Sb having a purity of 99.99 wt. % into a vacuum melting furnace at an alloy ratio of 80:20 by weight, performing vacuum treatment to $1\times10^{-2}$ Pa, charging nitrogen and then heating the alloy to a temperature of 650-700° C. to be melted, performing electromagnetic stirring at the same time to make the alloy composition uniform, and then performing vacuum casting, so as to obtain a Bi—Sb20 master alloy;

1) placing metals Sn and Ag having a purity of 99.99 wt. % into a vacuum melting furnace at a certain alloy ratio, performing vacuum treatment to $1\times10^{-2}$ Pa, charging nitrogen and then heating the alloy to a temperature of 500-650° C. to be melted, performing electromagnetic stirring at the same time to make the alloy composition uniform, and then performing vacuum casting, so as to obtain a SnAg20 master alloy;

3) melting the prepared Bi—Sb, Sn—Ag master alloys together with metals Sn and Bi at an alloy ratio in the melting furnace, covering a surface of the alloy with an anti-oxidation solvent (KCL-LiCl fused salt), heating the alloy to a temperature of 500° C., maintaining the temperature for 20 minutes, removing oxide slag on the surface, pouring into a mold to obtain an ingot of SnBi42.3Sb2Ag0.5 lead-free solder alloy.

Figure 2:
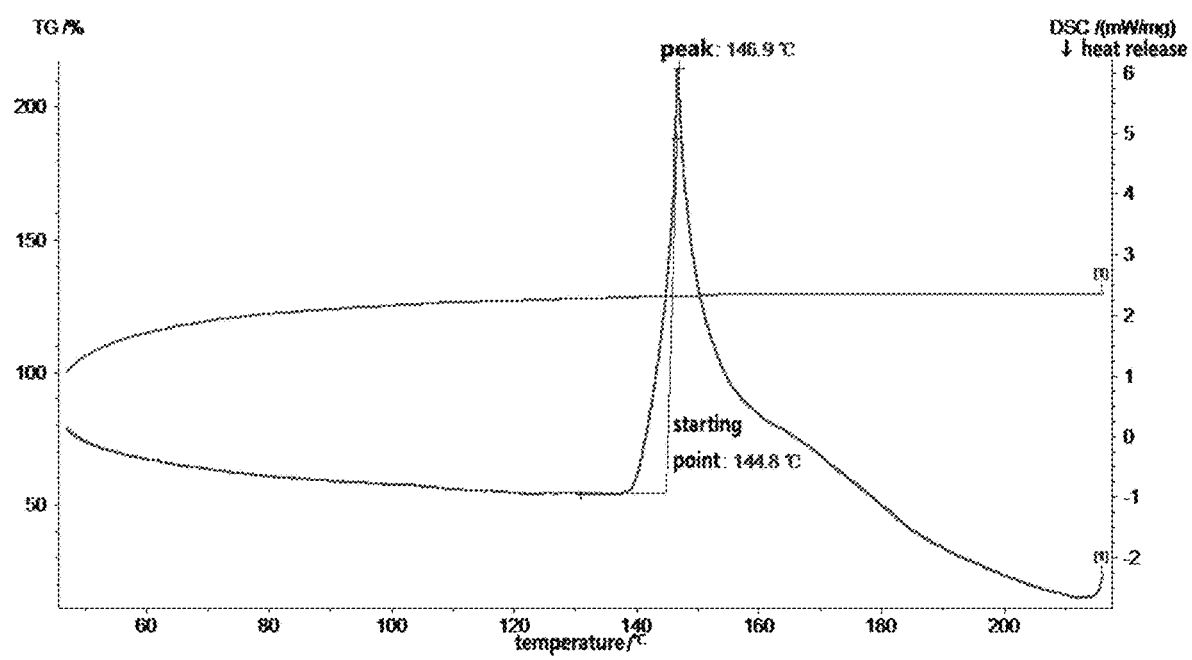
FIG. 2 shows the DSC test result of the solder alloy prepared according to example 10 of the present invention.

FIG. 2 shows DSC test results of the solder alloy prepared in the example 10. It can be seen from the figure that its melting point is 144.8-146.9.

Comparative Example 1

A lead-free solder alloy used in a low temperature is provided, the lead-free solder alloy comprising by weight: 58% of Bi, 42% of Sn, with a melting point of the solder alloy being 138° C.

Comparative Example 2

A lead-free solder alloy used in a low temperature is provided, the lead-free solder alloy comprising by weight: 57% of Bi, 1.0% of Ag, with the remainder being Sn, and the melting point of the solder alloy being 138-140° C.

Test Experiment

1. Measurement of Melting Point

The test for melting point is performed under a heating rate of 10° C./min by using an STA409PC differential scanning calorimeter (TA Instrument), wherein the mass of the sample is 30 mg, data processing is performed automatically by software calculation, and a peak temperature of the DSC curve is recorded as the melting point value of the solder alloy.

2. Conditions for Wettability Test

An alloy having a mass of 0.6 g is obtained and mixed with a certain amount of flux, and then placed on an oxygen free copper plate having a size of 30×30×0.3 mm (oxide and dirt are removed from the surface of the copper plate), and then the copper plate is placed on a flattening oven to be heated to 180° C., and then cooled to room temperature to form a welding spot after the solder has been melted and spread. The spread area of the welding spot is measured using a CAD software.

3. Sample Preparation

Tensile samples and copper welded samples are prepared and tested with reference to Japanese Industrial Standards JIS Z 3198.

4. Mechanical performance data are measured on a universal material testing machine of the type AG-50KNE in accordance with methods in GB/T228-2002, wherein the stretching speed is 5 mm/min, and three samples are tested for each data point to obtain average values.

5. Reliability assessment method: Vibration experiments are carried out on copper sheet welded samples with weights having a weight of 2 kg; the number of vibrations when the welding spot of the copper sheet welded sample breaks are recorded; and 10 samples are tested for each data point to obtain average values.

TABLE 1

Comparison of melting point and wetting performance of solder alloy

| | solder alloy composition | alloy melting point (° C.) | spread area (μm$^2$) |
|---|---|---|---|
| Example 1 | SnBi41.8Sb2.1 | 142.9-150.8 | 64.2 |
| Example 2 | SnBi50Sb1 | 140.6-143.8 | 65.9 |
| Example 3 | SnBi55Sb0.8Ce0.01Ti0.05 | 142.9-146.2 | 63.1 |
| Example 4 | SnBi44.2Sb1.7Ce0.05Ti0.1 | 145.2-150.5 | 70.2 |
| Example 5 | SnBi44.2Sb1.7Ce0.1Ti0.8 Cu0.01Ni0.03 | 147.5-152.9 | 71.6 |
| Example 6 | SnBi56.5Sb0.7Ce0.5 Ti1Cu0.03Ni0.07Ag0.1 | 146.1-154.3 | 73.5 |
| Example 7 | SnBi45Sb1.5Ce1Ti1.5Cu0.1 Ni0.5Ag0.5 | 144.9-152.7 | 74.9 |
| Example 8 | SnBi42.3Sb2Ce1.5Ti1.5Cu0.5Ni1.2 Ag0.8In0.05 | 148.5-158.7 | 76.7 |
| Example 9 | SnBi42.3Sb2Ce2.5Ti2Cu0.8 Ni1.5Ag1In1 | 150.1-159.3 | 78.5 |
| Example 10 | SnBi42.3Sb2Ag0.5 | 144.8-146.9 | 72.1 |
| Comparative Example 1 | SnBi58 | 138 | 60.5 |
| Comparative Example 2 | SnBi57Ag1 | 138-140 | 65 |

TABLE 2

Comparison of mechanical performance of solder alloy

| | Solder alloy composition | Tensile strength (MPa) | Number of vibration shocks |
|---|---|---|---|
| Example 1 | SnBi41.8Sb2.1 | 92.43 | 14380 |
| Example 2 | SnBi50Sb1 | 98.89 | 15200 |
| Example 3 | SnBi55Sb0.8Ce0.01Ti0.05 | 95.62 | 11636 |
| Example 4 | SnBi44.2Sb1.7Ce0.05Ti0.1 | 102.71 | 12701 |
| Example 5 | SnBi44.2Sb1.7Ce0.1Ti0.8Cu0.01Ni0.03 | 101.07 | 12989 |
| Example 6 | SnBi56.5Sb0.7Ce0.5Ti1Cu0.03Ni0.07Ag0.1 | 98.25 | 11050 |
| Example 7 | SnBi45Sb1.5Ce1Ti1.5Cu0.1Ni0.5Ag0.5 | 108.05 | 12123 |
| Example 8 | SnBi42.3Sb2Ce1.5Ti1.5Cu0.5Ni1.2Ag0.8In0.5 | 102.68 | 13576 |
| Example 9 | SnBi42.3Sb2Ce2.5Ti2Cu0.8Ni1.5Ag1In1 | 104.77 | 13900 |
| Example 10 | SnBi42.3Sb2Ag0.5 | 100.23 | 11000 |
| Comparative Example 1 | SnBi58 | 73.62 | 9230 |
| Comparative Example 2 | SnBi57Ag1 | 61 | 9808 |

Using the SnBiSb series low-temperature lead-free solder of the present invention, it is possible to form welding spot or welding seam with common solder paste reflux, wave soldering, or heat fusion welding, wherein the heat fusion welding includes preformed soldering lug, soldering strip, soldering ball and soldering wire etc., and in addition to the solder composition, the welding spot or welding seam alloy also includes other substrate alloying elements, such as but not limited to Cu, Ag, Ni, Au. The resulted welding spot or welding seam alloy comprises by weight the following composition: Bi 32.8-56.5%, Sb 0.7-2.2%, Cu 0.01-1.5%, Ni 0.03-2.0%, Ag 0.1-1.5%, Ce 0-2.5%, Ti 0-2.0%, In 0-1%, with the remainder being Sn and small amount of inevitable substrate alloying elements.

Compared with the prior art, the solder alloy prepared according to the present invention has a peritectic or near peritectic structure with a low melting point, thereby fundamentally solves the problem of brittleness and poor reliability of SnBi solder, while having excellent mechanical performance and reliability, and thus applicable to low-temperature soldering field.

What is claimed is:

1. A SnBiSb series lead-free solder, comprising: by weight 32.8%-45% of Bi, 0.7%-2.2% of Sb, 0.01%-2.5% of Ce, 0.05%-2.0% of Ti, and Sn, wherein a weight percentage of Bi and a weight percentage of Sb satisfy a relationship of $b=0.006a^2 0.672a+19.61+c$, wherein a is the weight percentage of Bi, b is the weight percentage of Sb, and a range of c is $-1.85 \leq c \leq 1.85$, and wherein the SnBiSb series lead-fee solder does not contain Mg, and the SnBiSb series lead-free solder has peritectic or near-peritectic structure, and a tensile strength of 92.43 to 108.05 MPa.

2. The SnBiSb series lead-free solder according to claim 1, wherein the Bi is 41.8%-45% by weight and the Sb is 0.7%-2.0% by weight.

3. The SnBiSb series lead-free solder according to claim 1, wherein the range of c is $0.008 \leq c \leq 1.5$.

4. The SnBiSb series lead-free solder according to claim 1, wherein the SnBiSb series lead-free solder further comprises one or more metal elements selected from the group consisting of Cu, Ni, Ag, and In.

5. The SnBiSb series lead-free solder according to claim 4, wherein the SnBiSb series lead-free solder comprises: 0.01%-0.8% of Cu by weight, 0.03%-1.5% of Ni by weight, 0.1%-1% of Ag by weight, 0.05%-1% of In by weight.

6. A preparation method for the SnBiSb series lead-free solder of claim 1, comprising the following steps:
   step (1) preparing a master alloy; master alloy comprises Bi-Sb, or Bi-Sb and one or more selected from the group consisting of Sn-Ce, Sn-Ti, Sn-Cu, Sn-Ni and Sn-Ag;
   step (2) melting the master alloy and metals Sn and Bi, or melting the master alloy, the metals Sn and Bi and one or more selected from the group consisting of Sn-Ce, Sn-Ti, Sn-Cu, Sn-Ni, Sn-Ag and In in a melting furnace at an alloy ratio; covering a surface of an alloy with an anti-oxidation solvent, heating the alloy to a temperature of 250° C.-500° C.; maintaining the temperature for 10 minutes-20 minutes; removing oxide slag on the surface; and pouring into a mold to obtain an alloy ingot of the SnBiSb series lead-free solder, and wherein the lead-fee solder does not contain Mg.

7. The preparation method for the SnBiSb series lead-free solder according to claim 6, wherein a method for preparing the master alloy of Bi-Sb comprises the following steps: placing separately Bi and Sb having a purity of 99.99 wt.% into a vacuum melting furnace at the alloy ratio; performing vacuum treatment to $1 \times 10^{-2}$ to $1 \times 10^{-1}$ Pa; charging nitrogen; heating a mixture of Bi and Sb to a temperature of 650° C.-700° C. to be melted, and performing electromagnetic stirring at the same time to make a composition of Bi and Sb uniform; and performing vacuum casting, so as to obtain the master alloy of Bi-Sb; and a method for preparing the master alloys of Sn-Ce, Sn-Ti, Sn-Cu, Sn-Ni, and Sn-Ag comprises the following steps: placing separately Sn and Ce, or Sn and Ti, or Sn and Cu, or Sn and Ni, or Sn and Ag having a purity of 99.99 wt.% into the vacuum melting furnace at the alloy ratio; performing vacuum treatment to $1 \times 10^{-2}$ to $1 \times 10^{-1}$ Pa; charging nitrogen; heating separately a mixture of Sn and Ce, or Sn and Ti, or Sn and Cu, or Sn and Ni, or Sn and Ag to a temperature of 400° C.-1650° C. to be melted, and performing electromagnetic stirring at the same time to make a composition of Sn and Ce, or Sn and Ti, or Sn and Cu, or Sn and Ni, or Sn and Ag uniform; and then performing vacuum casting, so as to obtain the master alloy of Bi-Sb, Sn-Ce, Sn-Ti, Sn-Cu, Sn-Ni or Sn-Ag.

8. The preparation method for the SriBiSb series lead-free solder according to claim 6, wherein the anti-oxidation solvent is rosin or KCL-LiCl fused salt.

9. A welding spot or welding seam formed by using the SnBiSb series lead-free solder of claim 1.

10. The welding spot or welding seam according to claim 9, wherein the welding spot or welding seam is formed by using solder paste reflux, wave soldering or heat fusion welding, wherein the heat fusion welding comprises a preformed soldering lug, soldering strip, soldering ball and soldering wire, and the alloy of the welding spot or welding seam comprises by weight the following composition: 32.8%-45% of Bi, 0.7%-2.2% of Sb, 0.01%-1.5% of Cu, 0.03%-2.0% of Ni, Ag 0.1%-1.5% of Ag, 0.01%-2.5% of Ce, 0.05%-2.0% of Ti, 0%-1% of In, with the remainder being Sn.

11. The preparation method for the SnBiSb series lead-free solder according to claim 6, wherein the Bi is 41.8%-45% by weight and the Sb is 0.7%-2.0% by weight.

12. The preparation method for the SnBiSb series lead-free solder according to claim 6, wherein the range of c is 0.008≤c≤1.5.

13. The preparation method for the SriBiSb series lead-free solder according to claim 6, therein the SriBiSb series lead-free solder further comprises one or more metal elements selected from the group consisting of Cu, Ni, Ag and In.

14. The preparation method for the SnBiSb series lead-free solder according to claim 13, wherein the SnBiSb series lead-free solder comprises: 0.01%-0.8% of Cu by weight, 0.03%-1.5% of Ni by weight, 0.1%-1% of Ag by weight, 0.05%-1% of In by weight.

15. The preparation method for the SnBiSb series lead-free solder according to claim 6, wherein a method for preparing the master alloy of Bi-Sb comprises the following steps: placing separately Bi and Sb having a purity of 99.99 wt% into a vacuum melting furnace at the alloy ratio; performing vacuum treatment to $1\times10^{-2}$ to $1\times10^{-1}$ Pa; charging nitrogen; heating a mixture of Bi and Sb to a temperature of 650° C.-700° C. to be melted, and performing electromagnetic stirring at the same time to make a composition of Bi and Sb uniform; and performing vacuum casting, so as to obtain the master alloy of Bi-Sb; and a method for preparing the master alloys of Sn-Ce, Sn-Ti, Sn-Cu, Sn-Ni, and Sn-Ag comprises the following steps: placing separately Sn and Ce, or Sn and Ti, or Sn and Cu, or Sn and Ni, or Sn and Ag having a purity of 99.99 wt.% into the vacuum melting furnace at the alloy ratio; performing vacuum treatment to $1\times10^{-2}$ to $1\times10^{-1}$ Pa; charging nitrogen; heating separately a mixture of Sn and Ce, or Sn and Ti, or Sn and Cu, or Sn and Ni, or Sn and Ag to a temperature of 400° C.-1650° C. to be melted, and performing electromagnetic stirring at the same time to make a composition of Sn and Ce, or Sn and Ti, or Sn and Cu, or Sn and Ni, or Sn and Ag uniform; and then performing vacuum casting, so as to obtain the master alloy of Bi-Sb, Sn-Ce, Sn-Ti, Sn-Cu, Sn-Ni or Sn-Ag.

16. The preparation method for the SnBiSb series lead-free solder according to claim 6, wherein the anti-oxidation solvent is rosin or KCL-LiCl fused salt.

17. The preparation method for the SnBiSb series lead-free solder according to claim 9, wherein the Bi is 41.8%-45% by weight and the Sb is 0.7%-2.0% by weight.

18. The preparation method for the SnBiSb series lead-free solder according to claim 9, wherein the range of c is 0.008<c<1.5.

19. The preparation method for the SnBiSb series lead-free solder according to claim 9, wherein the SnBiSb series lead-free solder further comprises one or more metal elements selected from the group consisting of Cu, Ni, Ag and In.

20. The preparation method for the SnBiSb series lead-free solder according to claim 19, wherein the SnBiSb series lead-free solder comprises: 0.01%-0.8% of Cu by weight, 0.03%-1.5% of Ni by weight, 0.1%-1% of Ag by weight, 0.05%-1% of In by weight.

* * * * *